(12) United States Patent
Huang et al.

(10) Patent No.: US 10,738,158 B2
(45) Date of Patent: Aug. 11, 2020

(54) CATION-CONDUCTING POLYMER

(71) Applicant: NATIONAL SUN YAT-SEN UNIVERSITY, Kaohsiung (TW)

(72) Inventors: Wen-Yao Huang, Kaohsiung (TW); Hsu-Feng Lee, Kaohsiung (TW)

(73) Assignee: NATIONAL SUN YAT-SEN UUNIVERSITY, Kaohsiung (TW)

( * ) Notice: Subject to any disclaimer, the term of this patent is extended or adjusted under 35 U.S.C. 154(b) by 217 days.

(21) Appl. No.: 16/023,273

(22) Filed: Jun. 29, 2018

(65) Prior Publication Data
US 2019/0390010 A1 Dec. 26, 2019

(30) Foreign Application Priority Data

Jun. 26, 2018 (TW) .............................. 107121969 A

(51) Int. Cl.
C08G 65/48 (2006.01)
C08G 65/40 (2006.01)
H01M 8/1032 (2016.01)

(52) U.S. Cl.
CPC ....... C08G 65/485 (2013.01); C08G 65/4056 (2013.01); H01M 8/1032 (2013.01); C08G 2650/28 (2013.01); H01M 2300/0082 (2013.01)

(58) Field of Classification Search
CPC .............................. C08G 65/48; C08G 65/485
See application file for complete search history.

(56) References Cited

U.S. PATENT DOCUMENTS

2017/0009016 A1* 1/2017 Huang ................... C08G 65/48

FOREIGN PATENT DOCUMENTS

| TW | 201504286 A | 2/2015 |
| TW | 201505244 A | 2/2015 |
| TW | I527842 B | 4/2016 |

OTHER PUBLICATIONS

Taiwanese Notice of Allowance dated Jun. 26, 2019 for Taiwanese Patent Application No. 107121969, 3 pages.

* cited by examiner

Primary Examiner — Stephan J Essex
(74) Attorney, Agent, or Firm — Jackson IPG PLLC; Demian K. Jackson

(57) ABSTRACT

A cation-conducting polymer has two or more repeating units of the following formula

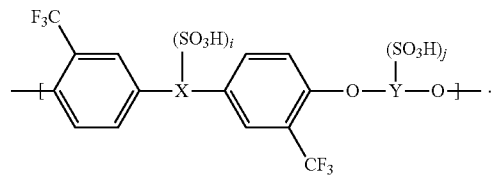

Owing to the cation-conducting polymer has good physico-chemical properties, hydrolytic stability and conductivity, a film formed by coating the liquid cation-conducting polymer can be used as proton exchange membrane to apply in fuel cell system.

9 Claims, 1 Drawing Sheet

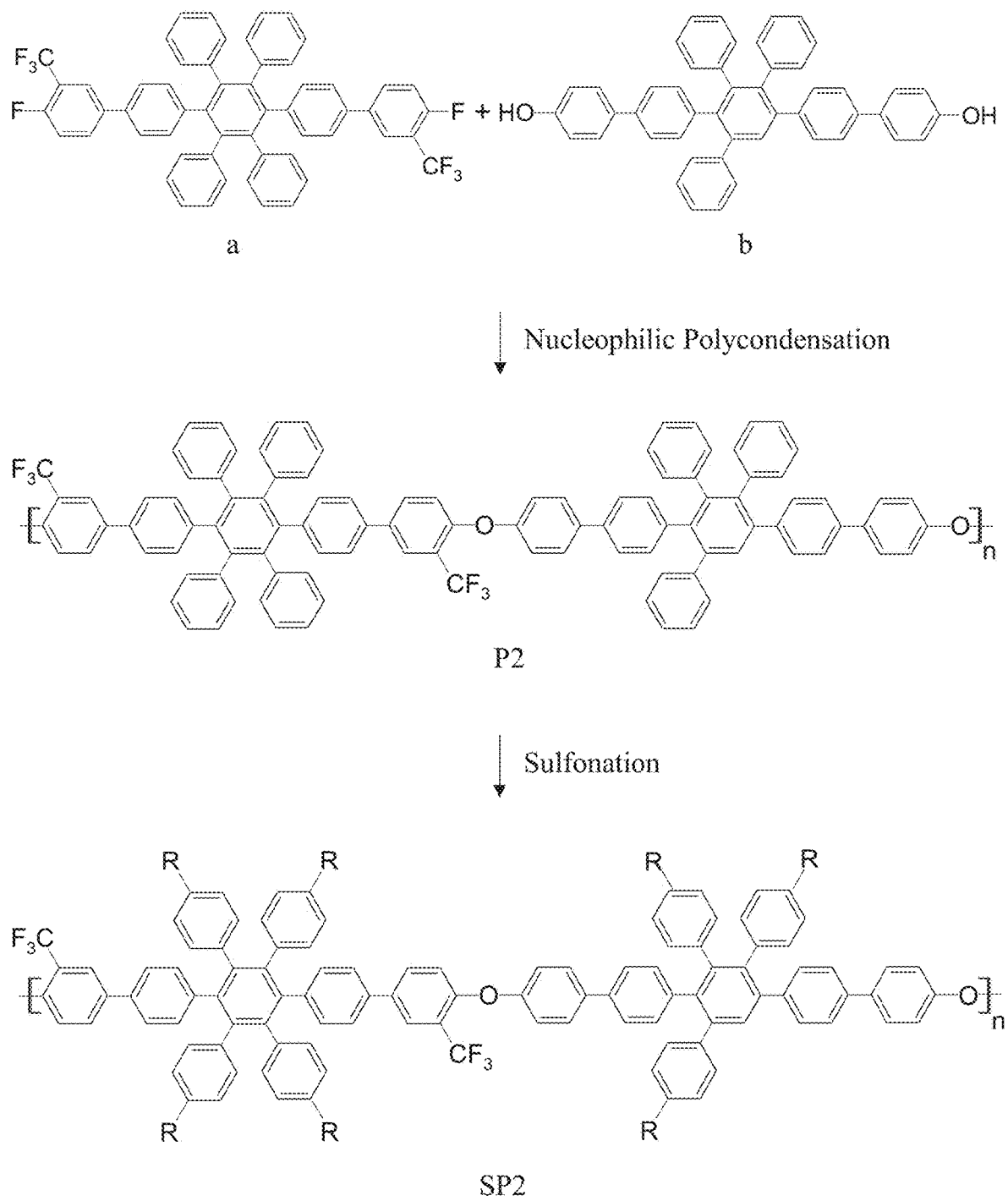

CATION-CONDUCTING POLYMER

FIELD OF THE INVENTION

This invention relates to a polymer, and more particularly relates to a cation-conducting polymer exhibiting good physicochemical properties, hydrolytic stability and conductivity.

BACKGROUND OF THE INVENTION

Fuel cells are designed to transform fuel's chemical energy into electrical energy directly by electrochemistry reaction. Proton exchange membrane fuel cell (PEMFC) is one of the common systems due to high conversion efficiency and high degree of environmental friendliness.

In PEMFC systems, hydrogen fed into the anode can diffuse toward the catalyst on anode side via the gas diffusion layer and be catalyzed to dissociate into protons ($H^+$) and electrons ($e^-$) by Pt in the catalyst ($H_2 \rightarrow 2H^+ + 2e^-$). Electrons flow to the cathode via external circuit and protons are transported into the catalyst on cathode side by the proton exchange membrane (PEM). In the cathode, water is generated by reduction reaction of protons, electrons and oxygen fed into the cathode ($4H^+ + 4e^- + O_2 \rightarrow 2H_2O$). PEMFC systems will not pollute the earth because the fuel is hydrogen and the products are water and heat ($2H_2 + O_2 \rightarrow 2H_2O$).

PEM is key component in performance and life-cycle of PEMFC systems. Perfluorosulfonic acid (PFSA) ionmer membranes, such as Nafion® (DuPont), are preferred materials due to high proton conductivity and great service life (more than 60000 h). However, PFSA membranes have some disadvantages such as decreased proton conductivity caused by low water retention in high-temperature and low-humidity environment, limited performance in higher temperatures because of low glass transition temperature (Tg), high cost and environmental inadaptability. As a result, alternative PEM materials are under intense investigation.

Taiwan patent I527842 disclosed a polymer of fluorine-containing sulfonated poly(arylene ether)s which was synthesized by nucleophilic polycondensation of fluorine-containing monomers having 1 to 6 fluoro or trifluoromethyl groups and multiphenyl monomers. However, the fluorine-containing monomers may cause decreased hydrophilicity and conductivity of the polymer and disadvantageous to PEM performance in fuel cell.

SUMMARY

An object of the present invention is to provide a cation-conducting polymer which has good physicochemical properties, hydrolytic stability and conductivity. Consequently, a film made by coating the liquid cation-conducting polymer can be used as a proton exchange membrane for fuel cell system.

A cation-conducting polymer of the present invention has two or more repeating units. Each of the repeating units is represented by the following formula.

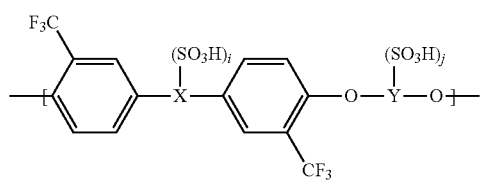

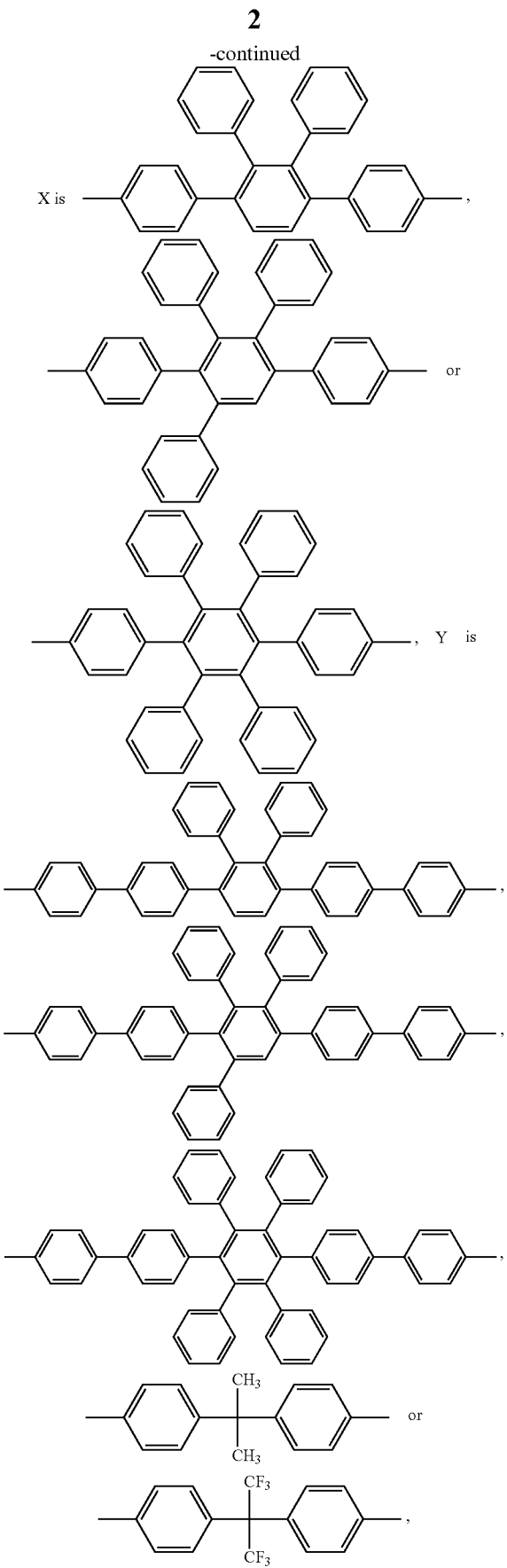

i is an integer greater than or equal to 1, and j is an integer greater than or equal to 1.

DESCRIPTION OF THE DRAWINGS

FIG. 1 is a synthesis scheme of a cation-conducting polymer of the present invention.

DETAILED DESCRIPTION OF THE INVENTION

The present invention discloses a cation-conducting polymer which has two or more repeating units, and each of the repeating units has the following formula

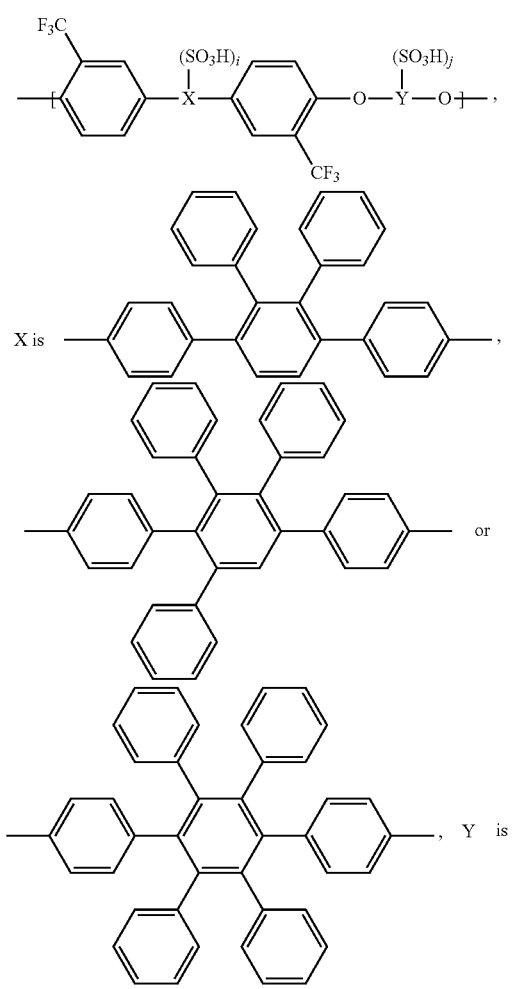

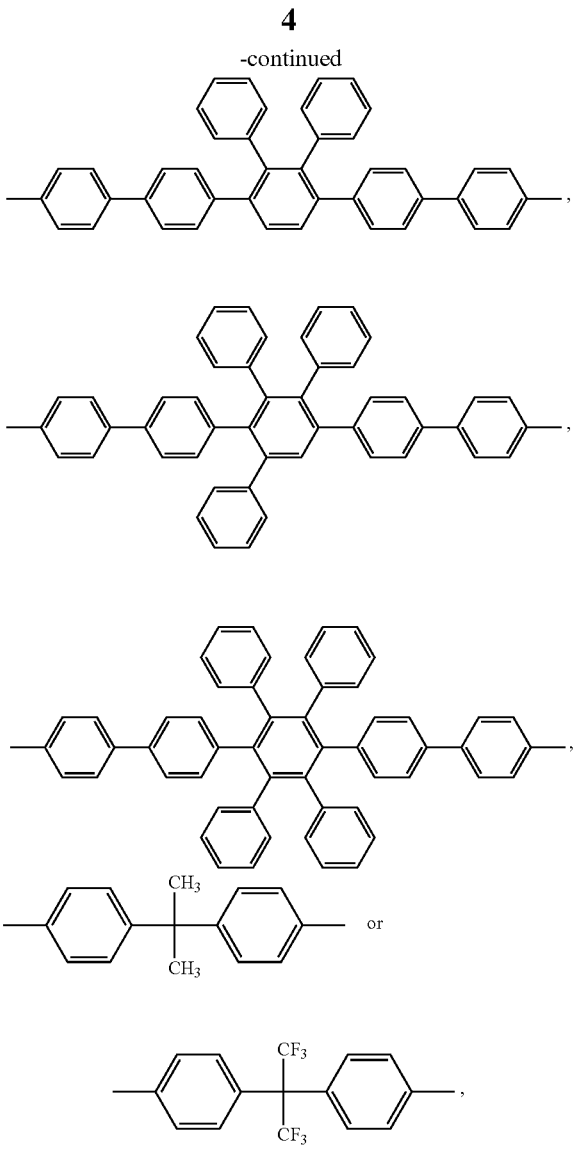

$SO_3H$ is hydrophilic sulfonate group, i is an integer greater than or equal to 1, and j is an integer greater than or equal to 1. Preferably, i and j are an integer from 1 to 10. In particular, the sum of i and j is an integer between 2 and 4, that is to say, each of the repeating units has 2 to 4 sulfonate groups.

In this embodiment, polymers P1, P2 and P3 without sulfonation are represented by the following formulas (P1)

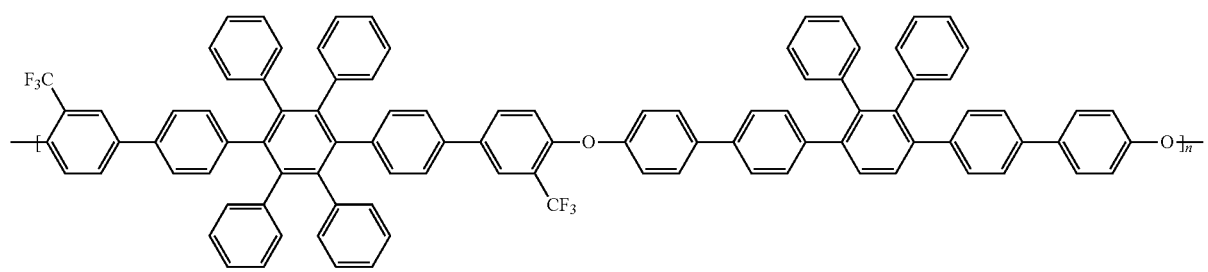

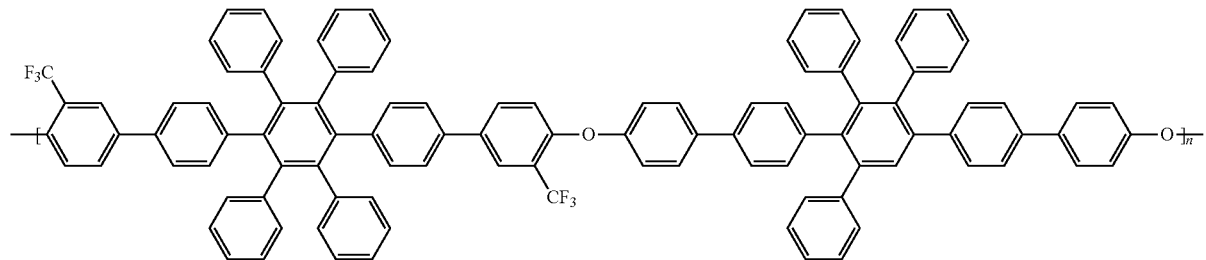
(P2)

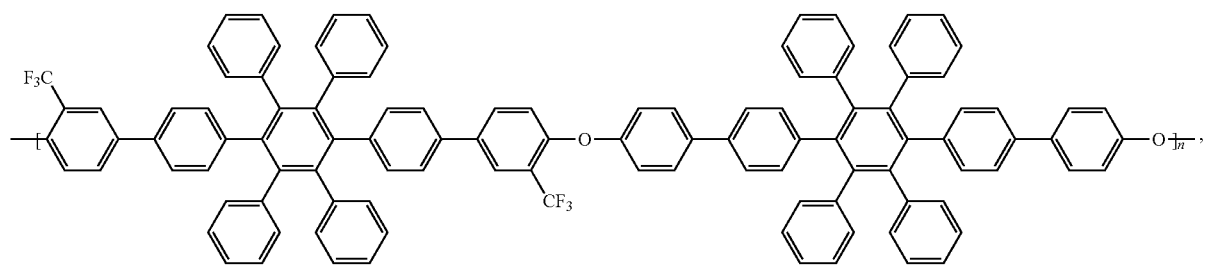
(P3)

n is an integer greater than or equal to 2. The polymers P1, P2 and P3 were synthesized via nucleophilic polycondensation of the difluoro monomer

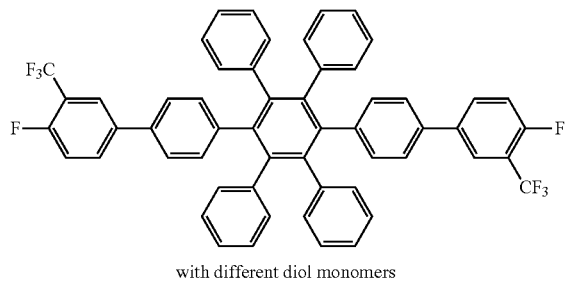

with different diol monomers

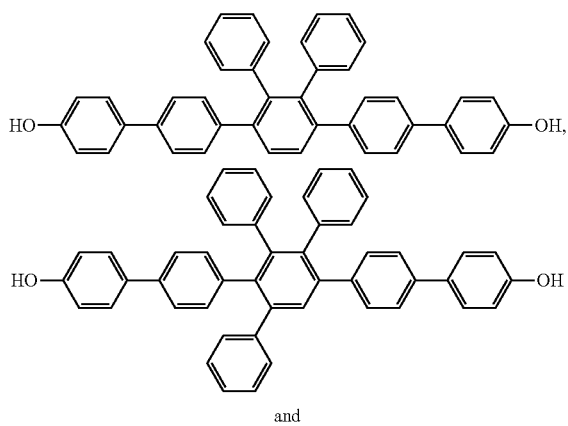

and

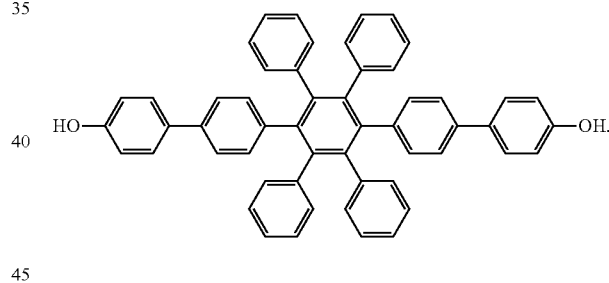

With reference to the following table 1, the polymer P2, as an example, can be classified into high molecular weight polymer P2-H, medium molecular weight polymer P2-M and low molecular weight polymer P2-L according to molecular weight. The weight-average molecular weight (Mw), number-average molecular weight (Mn) and polymer dispersity index (PDI, Mw/Mn) are summarized in the table 1.

TABLE 1

| Sample | Mw | Mn | PDI |
| --- | --- | --- | --- |
| P2-H | 180,000 | 80,000 | 2.2 |
| P2-L | 100,000 | 65,000 | 1.5 |
| P2-M | 65,000 | 32,000 | 1.8 |

Sulfomated polymers SP1, SP2 and SP3 represented by the following formulas were obtained by the sulfonation of the polymers P1, P2 and P3

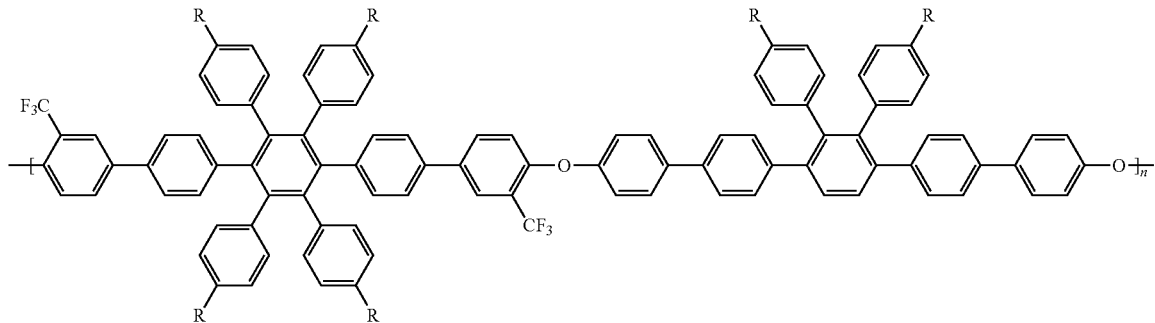

(SP1)

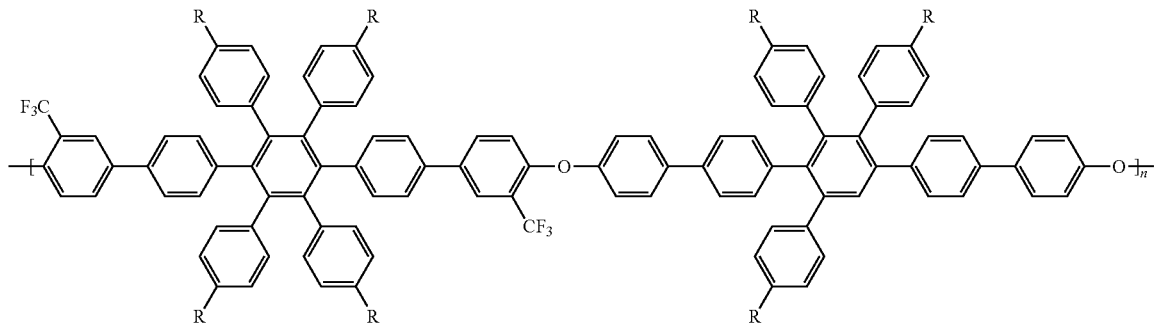

(SP2)

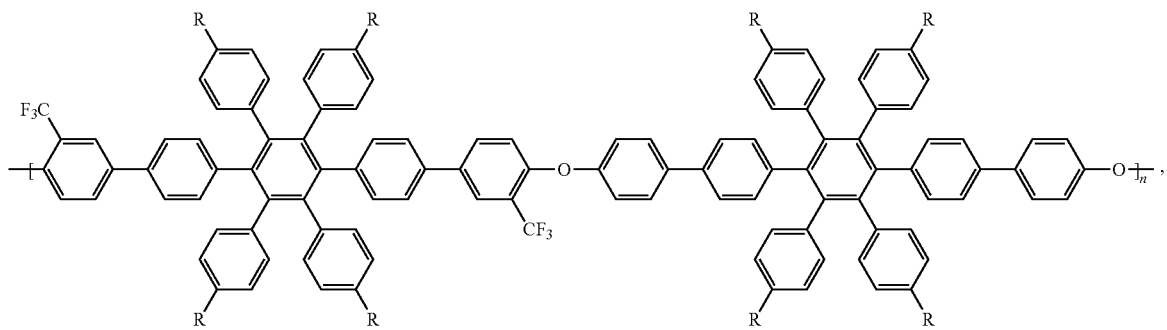

(SP3)

n is an integer greater than or equal to 2, R is hydrogen (H) or sulfonate group (—$SO_3H$). Preferably, each of the repeating units of the sulfonated polymers SP1, SP2 and SP3 has 2 to 4 sulfonate groups.

For example, the sulfonated polymer SP2 was synthesized according to the synthesis scheme showing in FIG. 1. Firstly, the polymer P2 was obtained by nucleophilic polycondensation of the difluoro monomer a with the diol monomer b. To a solution of polymer P2 in dichloromethane, and chlorosulfonic acid solution in dichloromethane was added dropwise under $N_2$ for sulfonation. The reaction mixture was poured into water, and the precipitated polymer SP2 was filtered, washed thoroughly with deionized water until the pH of the washings was neutral, and then dried in vacuum.

The examine results of the sulfonated polymers SP1, SP2 and SP3 are summarized in the following table 2.

TABLE 2

| Sample | Oxidative Stability(%) | Dimensional Stability(%) | Proton Conductivity(mS/cm) |
|---|---|---|---|
| SP1 | 99 | 20 | 172 |
| SP2 | 98 | 26 | 260 |
| SP3 | 95 | 28 | 143 |

Oxidative stability was evaluated by immersing the sample into Fenton's reagent (3% $H_2O_2$ aq. containing 2 ppm $FeSO_4$) at 80° C. for 1 h and weighting the residual weight. Dimensional stability was evaluated by immersing the sample into water at 80° C. for 24 h and calculating the change in length, width and thickness. Proton conductivity was measured when the sample was exposed to high temperature and humidity environment (80° C./95% RH). According to the examine results, the sulfonated polymers SP1, SP2 and SP3 exhibit good oxidative stability; dimensional stability and proton conductivity.

The following table 3 summarizes the properties of polymers SP2-H, SP2-M, SP2-L and commercial Nafion 211 (DuPont™ Nafion® PFSA NR-211).

TABLE 3

|  | SP2-H | SP2-M | SP2-L | Nafion 211 |
|---|---|---|---|---|
| Thermal Stability |  |  |  |  |
| $T_{d5\%}$(° C.) | 265 | 266 | 252 | — |
| Oxidative Stability |  |  |  |  |
| Residual Weight(%) | 99 | 95 | 93 | 99 |
| Dimensional Stability |  |  |  |  |
| Change in Length(%) | 15 | 20 | 41 | 15 |
| Change in Thickness(%) | 17 | 35 | 53 | 20 |
| Water uptake(%) | 84 | 114 | 146 | 30 |
| IEC(mmol/g) | 3.27 | 3.48 | 3.30 | 0.95 |
| Proton Conductivity(mS/cm) | 207 | 229 | 242 | 115 |

The sulfonated polymer SP2 exhibited good thermal stability, with $T_{d5}\%$ (temperature for 5 wt % loss) between 252 and 266° C. Oxidative stability was evaluated by immersing samples into Fenton's reagent (2 ppm $FeSO_4$ in 3% $H_2O_2$ solution) at 80° C. for 1 h and weighting the residual weight. The sulfonated polymer SP2 exhibited excellent oxidative stability because they had the residual weight higher than 90% after oxidative treatment. Dimensional stability and water uptake were measured by immersing the sample into water at 80° C. for 24 h and calculating the increase in length, thickness and mass. The water sorption of the sulfonated polymer SP2 was between 84 and 146%, much higher than commercial Nafion 211, but the change in length and thickness of the sulfonated polymer SP2 didn't increase with increasing water sorption. As a result, the sulfonated polymer SP2 exhibited lower swelling ratio in hot water than commercial Nafion 211. The sulfonation degree of the sulfonated polymer SP2 was provided by IEC (ion exchange capacity) analysis, and the TEC value was determined by acid-base titration and increased with increasing the degree of sulfonation. According to the examine results, IEC value and proton conductivity of the sulfonated polymer SP2 were both higher than that of commercial Nafion 211, meeting the expectations.

A film formed by coating the liquid cation-conducting polymer of the present invention can be used as a proton exchange membrane to apply in fuel cell systems because the cation-conducting polymer has good thermal stability, oxidative stability, dimensional stability, ion exchange capacity and proton conductivity.

In the cation-conducting polymer of the present invention, the aromatic rings having hydrophobic trifluoromethyl groups ($CF_3$) are the hydrophobic domains because the trifluoromethyl groups can greatly minimize the attack probability of sulfonate groups, and the aromatic rings having hydrophilic sulfonated groups are the hydrophilic domains such that the hydrophobic/hydrophilic domains in the cation-conducting polymer can induce microphase separation. Additionally, the multiphenyl groups and trifluoromethyl groups can improve the solubility of the cation-conducting polymer and the formation of high molecular weight polymer having long chain, so the cation-conducting polymer of the present invention can increase the number of potential physical crosslinks because of high self-aggregation ability; and can form a film having low swelling ratio because of high free volume. Consequently, the excellent mechanical property and dimensional stability of the cation-conducting polymer of the present invention provide a benefit in fuel cell application.

While this invention has been particularly illustrated and described in detail with respect to the preferred embodiments thereof it will be clearly understood by those skilled in the art that is not limited to the specific features shown and described and various modified and changed in form and details may be made without departing from the spirit and scope of this invention.

What is claimed is:

1. A cation-conducting polymer comprising two or more repeating units of the following formula

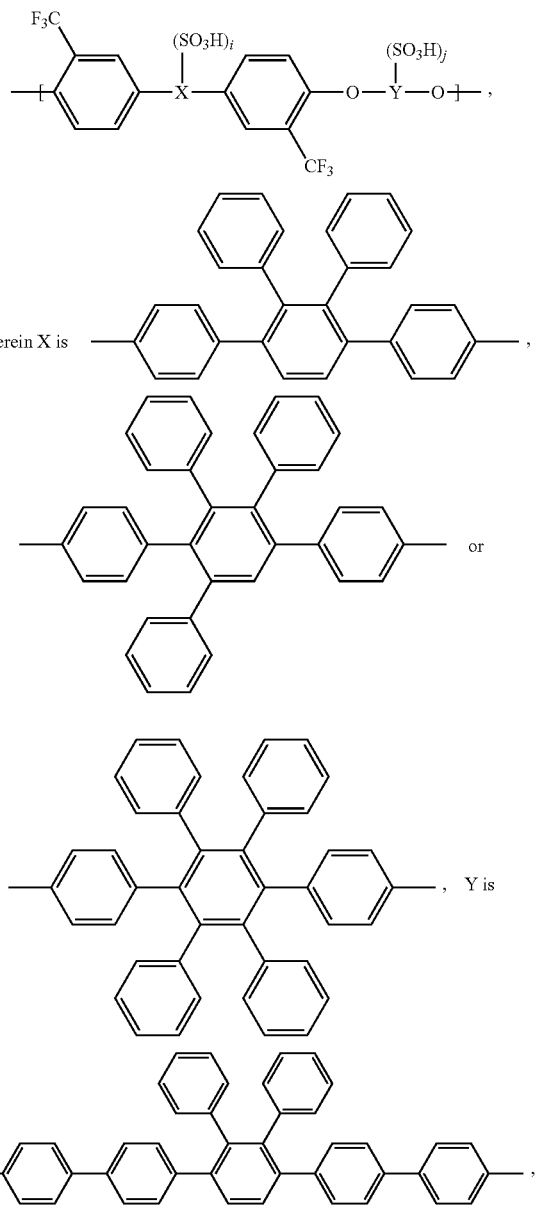

-continued

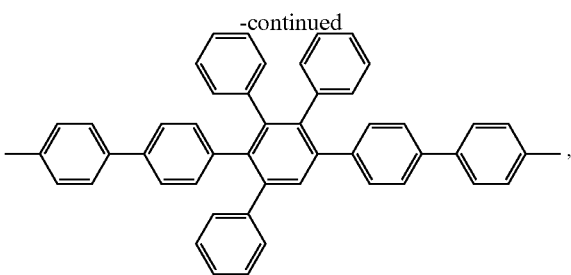

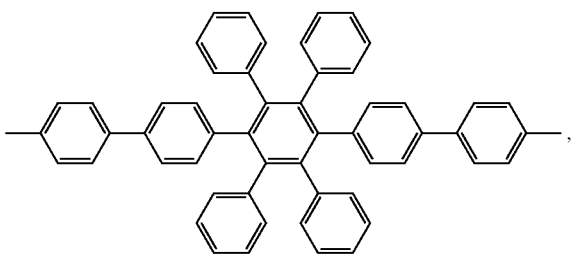

-continued

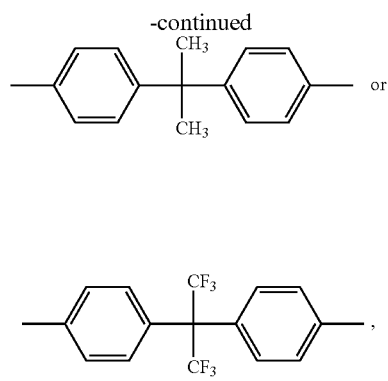

i is an integer greater than or equal to 1, and j is an integer greater than or equal to 1.

2. The cation-conducting polymer in accordance with claim 1, wherein i is an integer from 1 to 10, and j is an integer from 1 to 10.

3. The cation-conducting polymer in accordance with claim 1, wherein each of the repeating units has 2 to 4 sulfonate groups.

4. The cation-conducting polymer in accordance with claim 1, wherein the polymer has the following formula (SP1)

R is hydrogen (H) or sulfonate group (—$SO_3H$), and n is an integer greater than or equal to 2.

5. The cation-conducting polymer in accordance with claim 4, wherein each of the repeating units has 2 to 4 sulfonate groups.

6. The cation-conducting polymer in accordance with claim 1, wherein the polymer has the following formula (SP2)

R is hydrogen (H) or sulfonate group (—SO₃H), and n is an integer greater than or equal to 2.

7. The cation-conducting polymer in accordance with claim 6, wherein each of the repeating units has 2 to 4 sulfonate groups.

8. The cation-conducting polymer in accordance with claim 1, wherein the polymer has the following formula

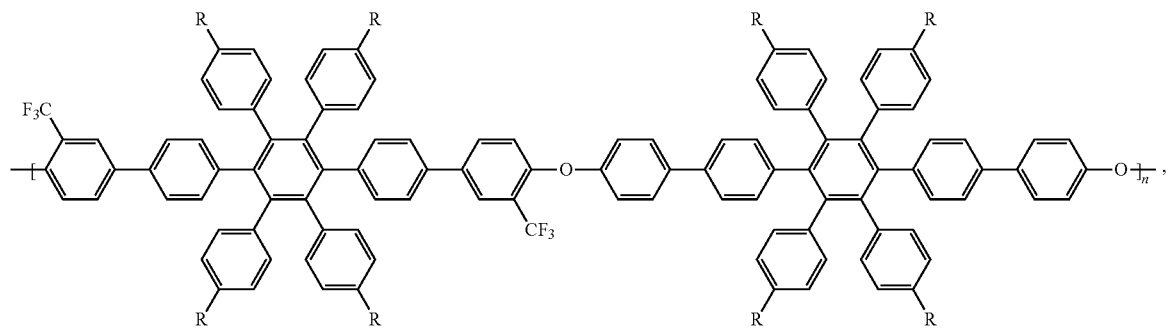

(SP3)

R is hydrogen (H) or sulfonate group (—SO₃H), and n is an integer greater than or equal to 2.

9. The cation-conducting polymer in accordance with claim 8, wherein each of the repeating units has 2 to 4 sulfonate groups.

\* \* \* \* \*